United States Patent

[11] 3,603,872

| [72] | Inventor | Edmond R. Pelta<br>Pacific Palisades, Calif. |
|---|---|---|
| [21] | Appl. No. | 24,429 |
| [22] | Filed | Apr. 9, 1970 |
| [45] | Patented | Sept. 7, 1971 |
| [73] | Assignee | Autoscan, Inc.<br>Los Angeles, Calif. |

[54] APPARATUS USING CURRENT SIGNALS TO ANALYZE THE IGNITION OF AN ENGINE
23 Claims, 4 Drawing Figs.

| [52] | U.S. Cl. | 324/16 |
|---|---|---|
| [51] | Int. Cl. | G01m15/00 |
| [50] | Field of Search | 324/15–19;<br>73/116–118 |

[56] References Cited
UNITED STATES PATENTS

| Re. 26,163 | 2/1967 | Heyer | 73/116 |
|---|---|---|---|
| 2,962,654 | 11/1960 | Wilson | 324/15 |
| 3,032,707 | 5/1962 | St. John | 324/16 |
| 3,404,333 | 10/1968 | Roberts | 324/15 |

Primary Examiner—Michael J. Lynch
Attorney—Smyth, Roston & Pavitt

ABSTRACT: This invention relates to a system for testing the ignition system of an automobile engine. The system develops a first current pulse when the voltage across the distributor gap for each cylinder in the engine breaks down. The system develops a second current pulse when the gap in the spark plug for each cylinder in the engine breaks down. Means are provided for determining whether each individual spark plug is operating properly. Means are also provided for determining the characteristics of the spark plug signal.

PATENTED SEP 7 1971

3,603,872

INVENTOR:
Edmond R. Pelta

ATTORNEYS

APPARATUS USING CURRENT SIGNALS TO ANALYZE THE IGNITION OF AN ENGINE

The present invention relates to a method and system for testing the ignition circuit of automotive engine for diagnostic purposes.

It has been found that the waveform of the electric current flowing in the distributor and ignition circuit of an automotive engine yields valuable information concerning the operative condition of the circuit. For example, the waveform of the current provides indication of the state of the spark plugs. Not only can an analysis of the current waveform determine whether or not one or more spark plugs are "dead," but also whether a spark plug is likely to burn out soon or fails to function properly, without having to remove the spark plug. In accordance with the invention it is suggested to couple a broad frequency band, inductive coupler circuit to a cable in the ignition circuit and to derive therefrom a voltage representative of the current waveform. The voltage is then analyzed as to specific characteristics indicative of the operative state of the ignition circuit. It was found, for example, that by coupling the probe conveniently to the cable leading from the ignition transformer to the distributor, the current flowing to the distributor after each opening of the breaker points shows two distinct current spikes for an operating spark plug, but only one spike if the distributor has a faulty spark plug connected to the ignition transformer. The slope after the respective last spike (if there are two) is indicative of possible impending spark plug failure. The current slope after the first spike is indicative of the resistance in the distributor circuit. It is an important aspect that for each breaker point opening an ignition spike does always occur in the ignition circuit, which spike can be used as trigger signal for controlling automatic or semiautomatic operating analysis equipment. Thus, every ignition current analysis can be performed automatically and in a self-synchronizing manner, yielding quick results as to the operating state of the ignition circuit.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawing in which:

Figure 1:
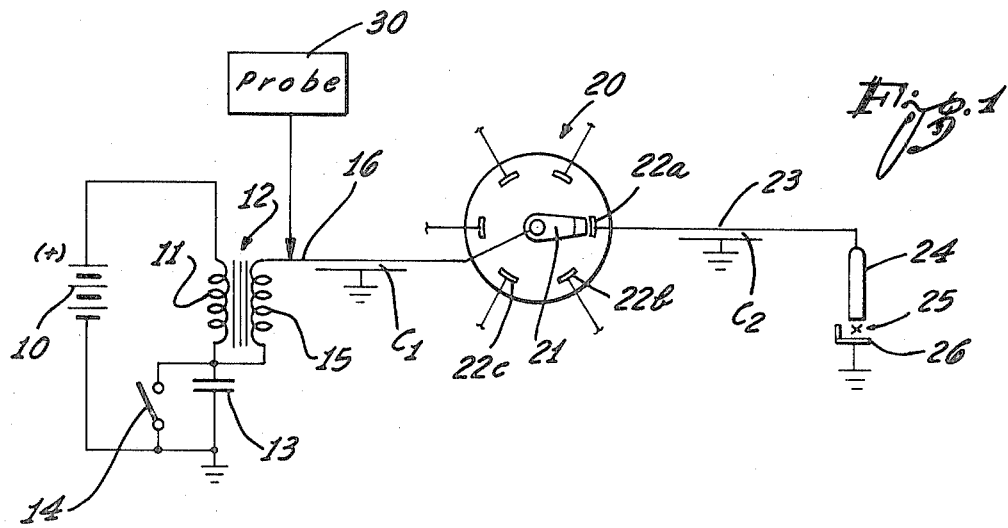
FIG. 1 illustrates a circuit diagram representative for an ignition of an automotive engine.

Proceeding now to the detailed description of the drawings, in FIG. 1 thereof, there is shown schematically an ignition circuit for an automotive engine having, for example, six cylinders. The ignition circuit includes a battery 10, a primary winding 11 of a step-up transformer 12 and a capacitor 13 connected in a series circuit. One pole of the battery together and one electrode of the capacitor are connected to ground or mass which, in general, would be the motor block chassis frame, etc., of the automotive car. The contact 14 denotes the so-called breaker points which are periodically opened and closed, in order to provide the ignition pulses particularly upon opening. The ignition pulses themselves form an alternation of charge and discharge of the capacitor 13 through the coil 11.

The spark plug/ignition circuit is connected to the high voltage secondary winding 15 of transformer 12. One side of the secondary winding 15 is grounded through contact 14 or capacitor 13. The other side of winding 15 connects to a first cable or wire 16 which connects transformer secondary 15 to the rotating contact arm 21 of the distributor 20. The cable 16 runs necessarily in the vicinity of the motor block and other parts of the vehicle having ground potential. In other words, the cable 16 is much closer to parts having mass or ground potential than the distance between the parts electrically connected by the cable 16. Therefore, the cable has an equivalent capacitance denoted symbolically by C1. Capacitance C1 is thus established by the wire proper in cable 16 and ground.

The distributor 20 has a plurality of pickup electrodes, such as 22a, 22b, 22c, etc., cooperating sequentially with the rotating electrode arm 21. The output circuit of the distributor for a six cylinder engine is constituted by six similar spark plug circuits, and, therefore, it suffices to show but one of them. In this case then, the one electrode, for example, the electrode 22a of the distributor 20 is connected to a cable 23 leading to one electrode of a spark plug 24. The other electrode 26 of the spark plug is grounded and defining spark gap 25. Again, the cable 23 exhibits a capacitance symbolically denoted with character C2 and established between the conductive wire of the cable 23 and mass or ground, because the connection between the distributor and the spark plugs will run in the vicinity of the motor block and other grounded parts.

Figure 2:
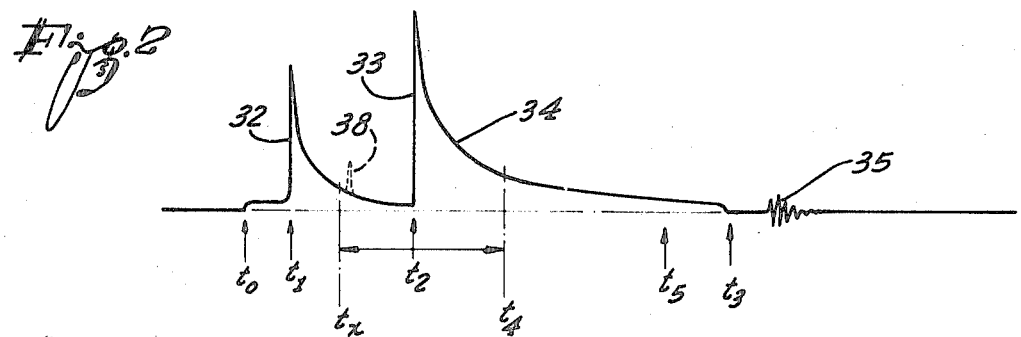
FIG. 2 shows the current waveform following opening of the breaker points when the spark plug to be ignited is operative.

In order to analyze the ignition circuit, a current probe 30 is inductively connected to cable 16, preferably right at the location where the one terminal of secondary 15 is connected to cable 16. Before proceeding to further details concerning the invention, reference is made to FIG. 2, illustrating the actual current flow in cable 16 at the point of attachment of the probe. It may be assumed that the breaker points open at the time $t_0$ and capacitor 13 begins to charge. As the charge circuit is actually a series resonant circuit, the voltage at the junction of primary 11 and capacitor 13 rises along a sine wave oscillation the amplitude of which is dependent upon the energy stored in the inductance of the transformer as well as the resonant frequency of the system. The voltage actually rises relatively slowly in electronic terms. There is a large leakage inductance between the primary and secondary of the coils, but during the time of rise before any arc occurs the primary and the secondary are tracking each other with the ratios determined essentially by the turns ratio of the high voltage coil acting as a transformer. At this time $t_0$ discharge current does not yet flow in the spark plug, nor is a voltage developed across the gap 25, nor is there an operative circuit connection between rotating electrode 21 and, for example, electrode 22a. Therefore, an effective (ohmic) load is not connected to across the secondary 15 at this time.

However, the existence of the parasitic capacitance C1 has to be considered; at time $t_0$ current begins to flow into wire 16 to the extent needed to charge the capacitance C1. Naturally, that current flow is quite low. As the capacitance C1 is being charged, the voltage across the distributor gap defined by rotating electrode 21 and one of the fixed distributor electrodes, for example, electrode 22a, builds up. At the time $t_1$ a breakthrough voltage is developed as between electrodes 21 and 22a. This results in a steep current pulse 32 in cable 16 through which, in effect, the same voltage potential previously built up at electrode 21 is transferred to electrode 22a. There is yet no discharge across spark plug gap 25, but current continues to flow through cable 16 to cause the second parasitic capacitance C2 to be charged.

The voltage between electrodes 24 and 26 of the spark plug increases with the charging of parasitic capacitance C2 which includes the capacitance of the spark plug itself. This charging current, of course, is rather low, particularly after dropping from the temporary peak 32. At a time $t_2$ spark gap 25 fires, closing the load circuit for the transformer 12. The current reaches a second peak 33 from which it decreases along a slope 34, essentially now due to the charging of capacitor 13 and as reflected into the secondary circuit of transformer 12.

As indicated in dotted lines in FIG. 2, additional spikes such as 38 may occur in between the main spikes 32–33. If, for example, the wire from the distributor to the particular spark plug has a break, it acts as a small capacitor. The resulting spike is smaller than peak 33 but for a fully developed break definitely above noise level. If there is a break in the wire between transformer and distributor, such a spike will even occur before spike 32. If there are several breaks, several such spikes occur accordingly.

AT the time $t_3$ the voltage effective across electrodes 24 and 26 becomes insufficient to sustain an arc across spark gap 25 and, therefore, the arc extinguishes. The current flow does not drop to zero, but the ripples 35 denote an oscillatory current in the wire 16 as a result of repeated firing and extinguishing of an arc discharge across the electrodes 21 and 22a, due to a still existing residual voltage resulting from incomplete charging of capacitor 13 in the primary circuit. The result is a decaying oscillation. At some time thereafter the pints close and still later the cycle is repeated. The discharge of capacitor 13 has no effect on the secondary circuit of the transformer 12. Soon the same signal sequence is repeated for the next spark plug/distributor electrode combination, pursuant to continued rotation of the distributor electrode 21.

Figure 2A:
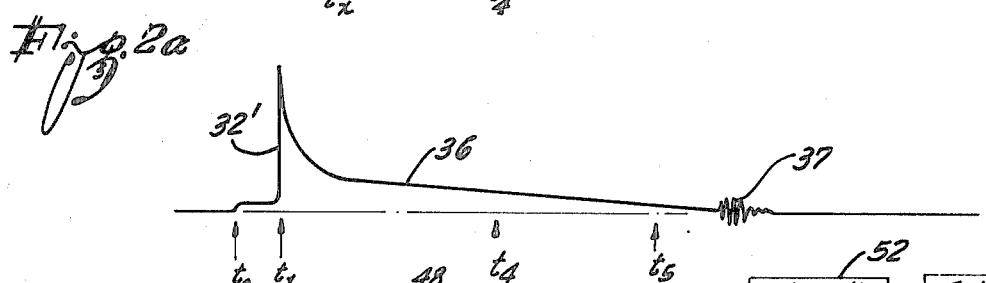
FIG. 2a shows the current waveform in an analogous plot but for a faulty spark plug.

As illustrated in FIG. 2a, the signal sequence differs from the aforedescribed one, if the spark plug is inoperative; for example, the spark plug may have a permanent relative low ohmic interelectrode connection, for example, due to dirt, burnouts, etc. Such a short circuit across the electrodes 24 and 26 prevents the spark plug from functioning as a spark plug. Of course, again at the time $t_0$ when the breaker points close, the parasitic capacitor C1 is first charged and thereafter, at the time $t_1$ a first charge pulse is generated across the gap defined by electrodes 21 and 22a (or 22b, or 22c, etc.). Again, after the electrode 22a has assumed line potential (cable 16) a rather low ohmic circuit connection is completed through the faulty spark plug. The current waveform will now be as depicted as trace 36, i.e., a relatively large current flows in the secondary circuit of the coil 15, again until the charge of capacitor 13 is exhausted, and until the voltage is insufficient to sustain an arc discharge across the gap as defined by electrodes 21 and 22a; ripples such as denoted with reference numeral 37, occur also. Thereafter a similar signal sequence is repeated, or one as shown in FIG. 2 is developed for the next spark plug, depending on its state.

The essential aspect of the curve plotted in FIG. 2a and when compared with the one plotted in FIG. 2 is the absence of a second current spike 33. Absence of that second peak indicates that the respective spark plug did, in effect, not fire. The significant factor, however, is that even in cases of a faulty spark plug there did occur this particular first spike 32, which is produced as a result of the parasitic and residual capacitance C1 and of the discharge gap, as defined between electrodes 21 and 22a of the distributor. A spike such as 38 in FIG. 2 would also occur in the wave train for a faulty spark plug, but these spikes 38 are of considerably smaller amplitude and thus readily distinguishable from a spark plug firing spike.

Figure 3:
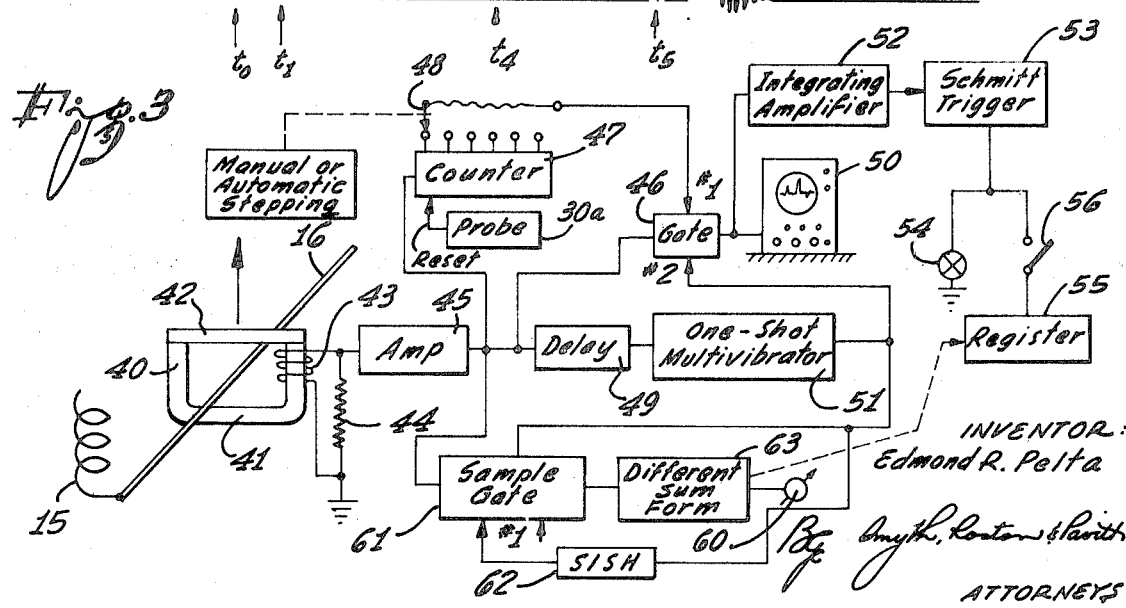
FIG. 3 illustrates a block diagram for a representative ignition current analysis device.

Turning now to FIG. 3, there is illustrated again the wire or cable 16 and particularly that portion thereof with which it is connected to the secondary 15 of transformer 12. The probe 30 now monitors the current flow in that portion of the cable 16. For this purpose the probe includes a closed loop core 40, comprised, for example, of a U-shaped core portion 41 having two legs interconnected by a yoke-type element 42 for completing a magnetic circuit path. The yoke 42 is removable to facilitate insertion of the wire 16 in the space circumscribed by the "U". The magnetic circuit path is closed in a plane transverse to the direction of current flow in conductor 16.

The core 41 carries a multiturn coil 43 across which is connected a resistor 44, to establish a current transformer serving as a proportional current waveform duplicator. It has to be considered that the bandwidth of the signals in the wire 16 range from a few megacycles down to frequencies around 1 kc., possibly down to about 0.1 kc., particularly if one wants to duplicate the waveforms 34 and 36. These signal portions are essentially aperiodic in nature; any apparent periodicity is only a simulated one due to repeated switching action in the circuit. The current in coil 43 and resistor 44 is proportional to the number of turns of coil 43 and to the current in wire 16. The voltage across resistor 44 is proportional to the resistivity of the resistor 44. The inductance of the coil 43 is proportional to the square of this turns. Therefore, one has to consider the following constraints.

On one hand, it is necessary that the resistance of resistor 44 is considerably smaller than the effective resistance of the coil 43 within the desired waveband. The voltage across resistor 44 should not be reduced too much by choosing too high a number of turns of coil 43, whereas a high effective equivalent impedance of the coil requires a relatively large number of turns. It has been found suitable that the number of turns of coil 43 should be about 17 for a 50 ohm resistance of resistor 44 in order to obtain an output voltage across resistor 44, which is proportional to the current in cable 16 within the desired bandwidth.

The voltage across a resistor 44 may be fed to an amplifier 45 to provide a more suitable level for the measuring signal. The output signal of amplifier 45 is passed to a gate 46 which, when open, permits the probe signal to control the Y-driver in an oscilloscope 50 for display thereof. The gate 46 could be omitted or permanently open if all ignition signal currents flowing through cable 16 are to be displayed indiscriminately as for cylinders. In order to observe the signal current for one cylinder, a counter 47 is provided having, for example, an adjustable recycling period to be made equal to the number of cylinders of the engine to be tested. Presently a six-stage counter is assumed. Counter 47 is advanced by each ignition signal, whereby it is assumed that in case a spike 32 serves as trigger pulse, a succeeding pulse 33 does not advance counter 47 again as it occurs before the input of the counter has stabilized to the extent that it can be desensitized to that extent, to positively prevent double counting of what is normally a single ignition pulse.

A selector switch 48 selects any of the six possible count numbers and thereby selects a time interval within the distributor cycle, recurring for a particular phase thereof and associated with a particular cylinder. The counter may operate with a slight delay, so that the duration of any particular counting state concurs with a complete sequence of signals shown in FIG. 2 (or 2a). In other words, the counter is placed by a particular pulse into the selected count state, but it is the next ignition pulse sequence which is actually selected thereby. The counter recycles in accordance with the number of cylinders of the engine. The counter is thus preferably constructed to be adjustable as far as the recycle period is concerned. In order to synchronize the counter cycle with a particular distributor phase, an inductive probe 30a may be placed temporarily next to one cable 23 leading to one spark plug. That probe 30a connects to counter 47 to force its resetting to count state zero with each ignition spike in that one particular spark plug circuit. The respective next spark plug in the distributor sequence then becomes the last spark plug in the selector sequence, because its current data is observed during count state zero of the counter.

The selected counting state is used as gating signal 01 for gate 46, so that the ignition current signals for one particular cylinder are displayed to the exclusion of others and repeated once per distributor revolution. The gating signal 01 for gate 46 is derived from counter 47 through selector 48 may additionally serve as unblanking signal for oscilloscope 50, and also as horizontal retrace control signal for triggering the time base thereof. The waveforms, such as shown in FIGS. 2 and 2a, are thus made visible. The appearance of a (second) spike 33 can be used as a visible indication that the particularly selected spark plug is operating properly.

In order to examine merely the occurrence of the second spike 33, there may be provided a delay device 49, also connected to the output side of amplifier 45. The first spike 32 as delayed is used to trigger a single shot monovibrator 51. In the diagram of FIG. 2 the triggering may occur at the time $t_x$. The single-shot 51 has, for example, an astable period to remain in the energized state from $t_x$ to the time $t_4$. The output signal of monovibrator 51 will be used for gating only if the complete ignition signal current waveform for a cylinder is not to be displayed. Otherwise, this second gating input for gate 46 is set for permanently permitting passage, and counter 47 provides the operating gating signals which suffice for this case.

One can see that gate 46, as controlled by signals 01 and 02, generates a "window" for the period of time $t_x - t_6$ during which period the spike 33 should occur if the selected spark plug is operative. That "window" has to be as sufficiently "wide" to allow for variations in the period between spikes 33 and 32. Such variations may occur as a result of variances in the parasitic capacitance C1 and due to tolerances or other irregularities in the distributor circuit itself. If the spike 33 appears within the gating window, an output pulse passes through gate 46 accordingly. The output of gate 46 may be displayed by oscilloscope 50, then showing only signal 33 if it, in fact, appears for the selected spark plug.

The pulses passing through gate 46 may be fed additionally (or in the alternative) to an integrating amplifier 52 having an output side connected to a Schmitt trigger 53, which, in turn, controls a lamp 54. Therefore, an accumulating sequence of pulses 33 will soon cause Schmitt trigger 53 to respond, and lamp 54 will light to indicate that the selected spark plug is operating properly. The lamp 54 will remain dark for a faulty spark plug where pulses 33 do not occur. The integrating circuit is preferably adjusted to suppress spikes such as 38 from causing an increase in output. Additionally, a second assembly of elements 52–53–54 can be provided which do respond to low level spikes indicative of wire breaks. By way of amplitude discrimination, this additional circuit can be desensitized to the spark plug spikes 33.

A testing operation after having placed probe 30 in position, simply sets switch 48 and observe lamp 54. If it remains dark, he resets switch 48 until all spark plugs have been tested. The system permits further automation in that switch 48 is step advanced automatically after remaining in each position for a particular period of time, and advancing is permitted only in response to an output pulse (spike) of gate 46, or in a response signal of Schmitt trigger 54. Advancing of cylinder selection stops when a faulty spark plug has been detected, and the stopped position indicates which one of the plugs is faulty.

The output signal of Schmitt trigger 53 may control a registration device 55 in case the equipment, as described, pertains to a coordinated engine testing apparatus. If a testing program is carried out, possibly automatically, a switch 56 is closed for the test to connect this particular test output signal (Schmitt trigger 53) to registration device 55. The result of the test will be registered by the recorder 55 as the output of Schmitt trigger 53 indicates whether or not a spark plug operates properly. Selector switch 48 is advanced in fixed steps, independent from the test result.

As furthermore shown in FIG. 3, the output signal of amplifier 45 may be admitted to a sampling circuit 61 in response to gating signal 01 as derived from selector 48. The trailing edge of the astable signal of monovibrator 51 (at time $t_4$) is used as sample signal (through differentiation) by sampling gate 61. The same signal triggers a second monovibrator 62, and the trailing edge of its astable signal may occur at time $t_5$. Through differentiation in the connection of monovibrator 62 to sampling circuit 61 a second sampling signal is applied to the sampling circuit.

For this test the time windows are represented by the two sampling signals. During each sampling signal, the instantaneous value of the amplitude of the signal sampled which is the output of amplifier 45, is fed to a circuit 63 forming, for example, the sum of the two sampled amplitude values. The sum is then indicated by a meter 60. This value represents the average current flow after an ignition spike and yields information on the resistance in the spark plug circuit. The circuit 63 can be adjustable to selectively form the difference between the sampled value. As the astable period of monovibrator 62 is known and a system constant, the difference metered is thus representative of the slope of signal portion 34 or 36 between times $t_4$ and $t_5$; that slope, in turn, is representative of the effective RC value in the spark plug circuit. Having sum and difference one obtains valuable information of the state of the capacitor 13 in the ignition circuit.

Delay 49 and astable period of monovibrators 51 and 62 can be made adjustable. If each is set to shorter periods, the current slope succeeding the first spike 32 can be sampled, for example, between such times as $t_x$ and $t_2$. The meter 60 will then provide a representation on the distributor circuit resistance. The sum-difference forming circuit 63 can be coupled to the registration device 55 to provide a record of the test performed. The meter 60 may be selectively connectable, for example, to Schmitt trigger 53, in lieu of lamp 54, and if suitable scales are provided on meter 60, even manual operation of this selective connection yields quick results on to the several tests to be performed.

A program may thus be run through, wherein first the meter 60 is connected to Schmitt trigger 53. Selector switch 48 is stepped through and after each new setting the meter is observed as it indicates, in fact, occurrence or nonoccurrence of actual spark plug firing. Then the meter 60 is reconnected and time elements 49, 51 and 62 are set (in common) to a first setting of relatively long delays to measure the slope of trace 34 between times $t_4$ and $t_5$, again for each cylinder through varying settings of switch 48; circuit 63 is changed for one cylinder selection setting to provide sum and difference of the sampled value, otherwise only the sum is measured as representative current average. Then the time elements are internally reconnected for shorter delays to observe the slope of the signal between times $t_x$ and $t_2$, again for each of the possible cylinder settings, whereby again circuit 63 may be adjusted as needed.

It can thus be seen that for performing the several tests, all that is required is the placement of the probe, and manipulating the switches while observing the meter. Due to microcircuit techniques, the entire circuit shown in FIG. 3 as connected to probe 30 will fit into a small case, and probe 30 is quickly placed in position. Hence, a filling station attendant can check a customer's ignition circuit with a very little effort. Supplementing the observation of registration of the values indicated by the meter permits establishing of a permanent record. Supplementing the unit further by automatic sequencing permits test conduction without attendance. Supplementing the unit by an oscilloscope permits full visual diagnosis of the waveform.

The invention is not limited to the embodiments described above but all changes and modifications thereof not constituting departures from the spirit and scope of the invention are intended to be included.

It is claimed:

1. An apparatus for testing the ignition circuit of an automotive engine, said ignition circuit including an ignition coil and a distributor and a plurality of spark plugs and at least a first able connected to the distributor and the ignition coil for breaking down the distributor to produce pulses of current and a second cable connected between the distributor and the spark plugs for subsequently breaking down gaps in the spark plugs to produce pulses of current and a second cable connected between the distributor and the spark plugs for subsequently breaking down gaps in the spark plugs to produce pulses of current, including;

first means for coupling to the first cable in the ignition circuit and during performance of a test to provide a signal representative of distributor breakdown and spark plug breakdown proportionately to the current flow in the cable over a bandwidth extending into the megacycle range and at least down to the ignition cycle frequency within the speed range of the engine;

second means connected to the first means and responsive to the pulse of current representing distributor breakdown to provide recurring control signals;

third means connected to the first and second means and responsive to the control signals from the second means to sample the amplitude of the signal representing the current flow in the spark plugs at the time of breakdown of the gaps in the spark plugs, at least once per engine cycle and for a period short relative to an engine cycle;

fourth means connected to the third means for providing a signal constituting a reference to which the sampled amplitude is processed; and fifth means connected to the fourth means and the first means to provide a visual indication of the amplitudes of the pulses of current flowing through the spark plugs relative to the reference signal.

2. Apparatus as set forth in claim 1 including sixth means responsive to the pulses of current from the third means for operating upon such pulses to provide an indication of the slope of the current for a particular period during such pulses.

3. Apparatus as set forth in claim 1 including sixth means responsive to the amplitude of the pulses of current from the third means to provide an indication of the current flow for successful firing of spark plugs.

4. An apparatus for testing the ignition circuit of an automobile engine, said ignition circuit including an ignition coil and a distributor and a plurality of spark plugs and a first cable connected to the distributor and the ignition coil for breaking down the distributor to produce pulses of current and a second cable connected between the distributor and the spark plugs for subsequently breaking down gaps in the spark plugs to produce pulses of current, including:

first means for coupling to the ignition circuit and including transmission means to provide an electrical signal in analog representation of the current flowing in the ignition circuit in accordance with the breakdowns in the distributor and in the spark plugs;

second means connected to the first means and responsive to the pulses of current representing distributor breakdown to provide a recurring test control signal of particular phase and delayed relation to the pulses of current;

third means connected to the first and second means and responsive to the recurring test control signal to provide amplitude detection of the pulses of current representing breakdown of the spark plug gap during the control signal; and threshold means operative only within a particular period of time after the occurrence of the pulses of current representing the distributor breakdowns for detecting the occurrence of the pulses of current representing breakdowns of the gap in the spark plug.

5. Apparatus as set forth in claim 4, including fifth means responsive to the amplitude detection of the pull of current representing breakdowns of the gaps in the spark plugs for sampling such amplitude at particular times during such pulses of current and sixth means responsive to the sampled amplitudes of the signals from the fifth means for operating upon such signals to arithmetically combine the sampled amplitudes to provide a determination of the operating characteristics of the ignition circuit.

6. Apparatus as set forth in claim 4 wherein means are connected to the third means to provide a display representation of the amplitude detection by the third means.

7. An apparatus for testing the ignition circuit of an automotive engine, said ignition circuit including an ignition coil and a distributor and a plurality of spark plugs and a first cable connected to the distributor and the ignition coil for breaking down the distributor to produce pulses of current and a second cable connected to the distributor and the spark plugs for subsequently breaking down gaps in the spark plugs to produce pulses of current, including;

a current transformer for coupling to the circuit connections leading to the distributor in the ignition circuit of the engine;

first circuit means connected to the current transformer for developing a voltage essentially proportionate to the current flow in said connection;

second circuit means operatively coupled to the first circuit means and responsive to a first voltage spike representative of distributor gap breakdown to provide a control signal representative there; and third means operatively coupled to the first and second circuit means to detect, within a particular period after the provision of the control signals, the occurrence of a second voltage spike representative of spark plug gap breakdown and to provide an indication of such occurrence.

8. An apparatus for testing the ignition circuit of an automotive engine, said ignition circuit including an ignition coil and a distributor and a plurality of spark plugs and a first cable connected to the distributor and the ignition coil for breaking down the distributor to produce pulses of current and a second cable connected to the distributor and the spark plugs for subsequently breaking down gaps in the spark plugs to produce pulses of current, including:

first means for coupling to a particular point in the input circuit for the distributor of the engine to provide electrical signals having an amplitude proportionate over a wide frequency range to the amplitude of the current flowing into the distributor upon each breakdown of the distributor;

second means connected to the first means for developing test function signals for a particular period of time in response to amplitudes above a particular value for the first signal;

third means responsive to the individual cylinder phases of the distributor to provide a sequence of sampling signals of relatively short duration with each individual one of the sampling signals in the sequence being associated with one particular cylinder;

fourth means connected to the third means to provide a selection of a particular cylinder phase among the several cylinder phases of each engine cycle so that sampling signals are selected for one particular cylinder only; and fifth means connected to the second and fourth means to sample the amplitude of the test function signals from the second means in response to the sampling signals as selected by fourth means.

9. An apparatus as in claim 8, including seventh means operatively coupled to the fourth means for providing at least a pair of sampling signals per selected cylinder in each engine cycle to obtain a sampling by the fifth means of at least a pair of amplitude values of the test function signals from the second means, and eighth means for arithmetically combining the sampled amplitude values to provide an indication of the operating characteristics of the ignition circuit of the particular cylinder.

10. An apparatus as in claim 8, the fifth means detecting absence or presence of another signal in the sampling period in representation of a breakdown in a gap in a spark plug.

11. An apparatus as in claim 8, the third means connected to receive the spikes and including a counter for counting out cylinder phases, the fourth means being responsive to a selected count number in the counter to associate sampling signals with count numbers.

12. Apparatus as set forth in claim 8 wherein means are connected to the fifth means for providing a visual display of the sampled electrical signals.

13. Apparatus for testing for an ignition current of an automotive engine having a plurality of cylinders and a distributor and ignition system for sequentially firing the cylinders in a cyclic pattern were the firing of each cylinder is obtained by initially breaking down a distributor gap for that cylinder to produce a first pulse of current and subsequently breaking down a gap in a spark plug for that cylinder to produce a second pulse of current, including first means for detecting the first and second pulses of current flowing through the ignition circuit during the firing of each cylinder, second means operatively coupled to the first means and responsive to the first pulse of current for providing a first control signal for a first particular period after the first pulse, and third means operatively coupled to the first and second means and operative only during the production of the first control signal in first particular period of activation for detecting whether the first means has produced the second pulse of current in representation of the breakdown of the spark plug.

14. Apparatus as set forth in claim 13, including fourth means operatively coupled to the second means and responsive to the first control signal for providing a second control signal during a second particular period of activation after the first particular period of activation, and fifth means operatively coupled to the first, second and fourth means and operative only during the production of the second control signal in the second particular period of activation for detecting the characteristics of the current during the second particular period.

15. Apparatus as set forth in claim 14, including sixth means operatively coupled to the third and fifth means and responsive to the characteristics of the current produced during the first and second particular periods of activation for indicating if there is an impending failure in the spark plug.

16. Apparatus for testing for an ignition current of an automotive engine having a plurality of cylinders and an ignition system for sequentially firing the cylinders in a cyclic pattern where the firing is obtained by initially breaking down a distributor gap for that cylinder to produce a first pulse of current and subsequently breaking down a gap in a spark plug for each particular cylinder to produce a pulse of current, including first means for detecting the pulse of current representing breakdown of the gap in a spark plug of a particular cylinder in the plurality;

second means operatively coupled to the first means and responsive to the pulse of current representing breakdown of the distributor gap for determining the amplitude characteristics of the pulse of current representing breakdown of the gap in the spark plug at a first particular time;

third means operatively coupled to the second means for determining the amplitude characteristics of the pulse of current at a second particular time following the first particular time by a particular time of interval; and fourth means operatively coupled to the second and third means for combining in a particular arithmetic relationship the amplitude characteristics of the signals from the second and the third means to obtain a determination of the characteristics in the breakdown of the spark gap for the particular cylinder.

17. Apparatus as set forth in claim 16 wherein the second means is adjustable to vary the first particular time and the third means is adjustable to vary the second particular time.

18. Apparatus as set forth in claim 16 wherein the fourth means adds and averages the amplitudes of the signals from the second and third means to obtain an average value of the amplitude characteristics of the pulse of current.

19. Apparatus as set forth in claim 16 wherein the fourth means obtains the difference between the amplitudes of the signals from the second and third means to obtain a determination of slope characteristics of the pulse of current.

20. Apparatus for testing an ignition current of an automobile engine having a plurality of cylinders and an ignition system for sequentially firing the cylinders in a cyclic pattern where the firing is obtained by breaking down a gap in a spark plug for such particular cylinder to produce a pulse of current, including first means for detecting the pulse of current in a particular cylinder in the plurality;

a first gate having open and closed conditions and having properties of preventing the passage of signal information when opened and of providing for the passage of signal information when closed;

a second gate having open and closed conditions and having properties of preventing the passage of signal information when opened and of providing for the passage of signal information when closed;

second means including the first gate for normally maintaining the first gate closed and for providing for the opening of the first gate at a first particular time during the pulse of current;

third means including the second gate for normally maintaining the second gate closed and for providing for the opening of the second gate at a second particular time during the pulse of current where the second particular time follows the first particular time by a particular time interval;

fourth means operatively coupled to the second means for sensing the amplitude characteristics of the pulse of current upon the opening of the first gate;

fifth means operatively coupled to the third means for sensing the amplitude characteristics of the pulse of current upon the opening of the second gate; and sixth means operatively coupled to the fourth and fifth means and responsive to the amplitude characteristics of the currents passing through the first and second gates for arithmetically combining these amplitude characteristics to obtain a determination of the characteristics of breakdown of the gap in the particular cylinder.

21. The apparatus set forth in claim 20 wherein the second means are adjustable to vary the first particular time and the third means are adjustable to vary the second particular time.

22. Apparatus as set forth in claim 20 wherein the sixth means operates to add the amplitudes of the pulses of current passing through the first and second gates to obtain an average value of such pulses.

23. Apparatus as set froth in claim 20 wherein the sixth means operates to obtain the difference between the amplitude of the pulses of current passing through the first and second gates to obtain slope characteristics of the pulse of current.